(12) United States Patent
Schroeder

(10) Patent No.: US 6,681,921 B1
(45) Date of Patent: Jan. 27, 2004

(54) ENCLOSED BELT CONVEYOR ASSEMBLY

(75) Inventor: Thomas A. Schroeder, Omaha, NE (US)

(73) Assignee: InterSystems, a division of Enduro Systems, Inc., Omaha, NE (US)

( * ) Notice: Subject to any disclaimer, the term of this patent is extended or adjusted under 35 U.S.C. 154(b) by 0 days.

(21) Appl. No.: 10/261,222

(22) Filed: Sep. 30, 2002

(51) Int. Cl.[7] ............................................. B65G 15/08
(52) U.S. Cl. ..................... 198/818; 198/493; 198/735.4
(58) Field of Search ................ 198/493, 498, 198/818, 819, 735.1, 735.3, 735.4, 735.5

(56) References Cited

U.S. PATENT DOCUMENTS

| | | | |
|---|---|---|---|
| 1,489,290 A | * 4/1924 | Walther | 198/498 |
| 4,230,222 A | 10/1980 | Clark | 198/580 |
| 4,471,868 A | * 9/1984 | Buschbom et al. | 198/735.4 |
| 5,174,433 A | 12/1992 | Moser | 198/734 |
| 6,059,094 A | 5/2000 | Swanstrom, Jr. et al. | 198/735.4 |
| 6,102,195 A | * 8/2000 | Weikel | 198/818 |
| 6,360,878 B1 | * 3/2002 | Deal et al. | 198/819 |

* cited by examiner

Primary Examiner—James R. Bidwell
(74) Attorney, Agent, or Firm—Thomte, Mazour & Niebergall; Dennis L. Thomte

(57) ABSTRACT

An enclosed belt conveyor assembly comprising a head section, a tail section, and one or more intermediate conveyor sections assembled between the head section and the tail section. A tail pulley is mounted in the tail section and a head pulley is mounted in the head section. One or more idler pulleys are mounted in the intermediate section or sections. An endless conveyor belt is trained around the tail and head pulleys to define an upper forward run from the tail pulley to the head pulley and a lower return run from the head pulley to the tail pulley. At least one wiper element is provided on the conveyor belt which is carried by the conveyor belt in a close relationship with respect to the inner surface of the bottom wall of the intermediate conveyor section for pulling material, that has spilled onto the inner surface of the bottom wall, towards the tail section. The movement of the wiper element in close proximity to the tail pulley shroud of the tail section causes the spilled material to be thrown upwardly onto the conveyor belt for conveying to the proper discharge point.

11 Claims, 3 Drawing Sheets

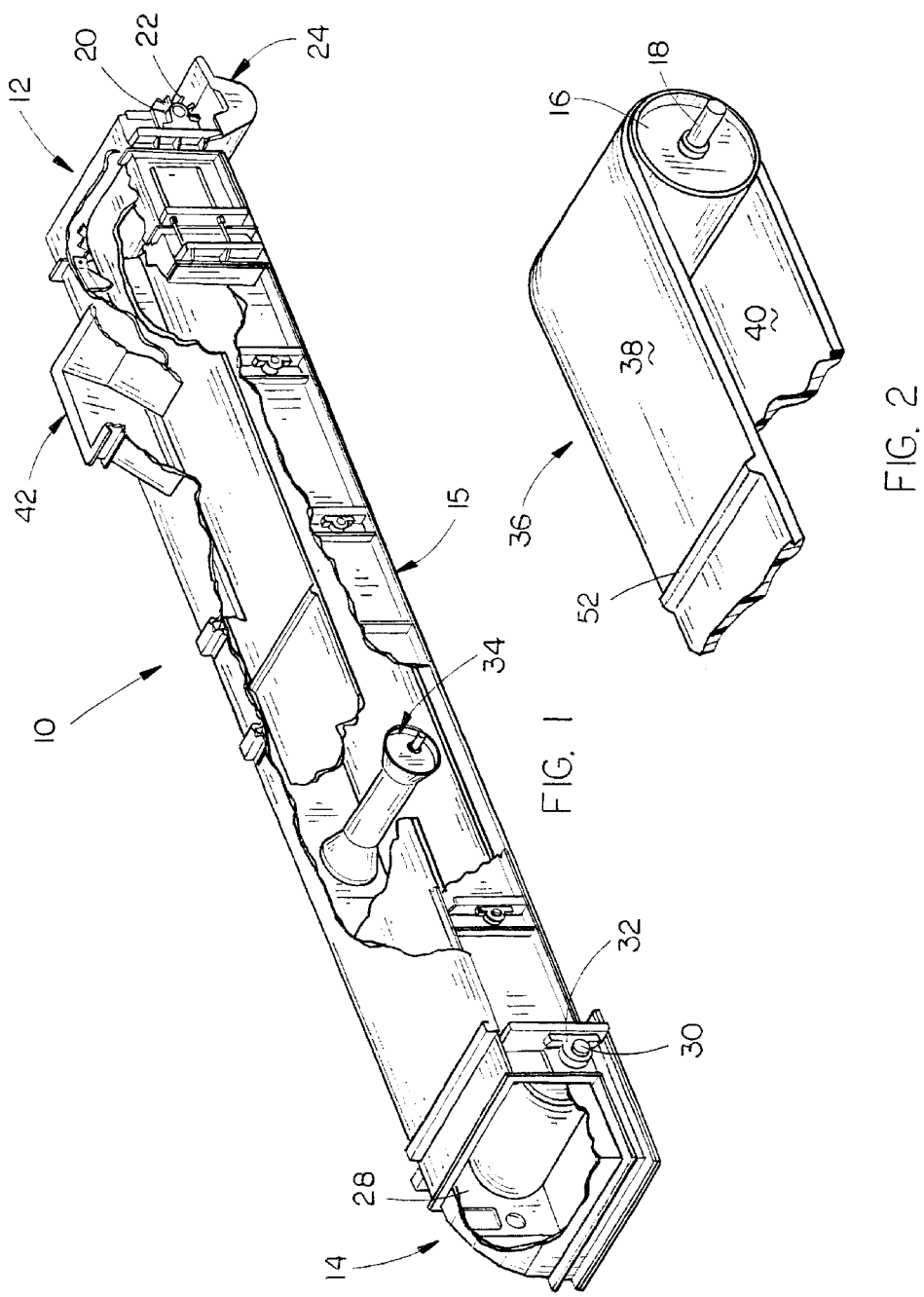

ENCLOSED BELT CONVEYOR ASSEMBLY

BACKGROUND OF THE INVENTION

1. Field of the Invention

This invention relates to an enclosed belt conveyor assembly and more particularly to an enclosed belt conveyor assembly including a conveyor belt which has a wiper element provided thereon which pulls material that has been spilled onto the inner surface of the bottom wall of the conveyor housing towards the tail section of the conveyor assembly.

2. Description of the Related Art

Enclosed belt conveyor assemblies have been manufactured for many years for conveying particulate material from one location to another. A prior art enclosed belt conveyor assembly is sold by InterSystems of Omaha, Nebr., under the trademark "RollerFLO™". The enclosed belt conveyor system of InterSystems includes head and tail sections having one or more intermediate conveyor sections assembled therebetween. A tail pulley is mounted in the tail section for rotation about a horizontal lateral axis. A head pulley is provided in the head section for rotation about a horizontal lateral axis. At least one conveyor belt idler roller is provided in the intermediate section for rotation about a horizontal lateral axis.

An endless flexible conveyor belt is trained longitudinally over the head pulley and the tail pulley and extends through the intermediate conveyor section or sections so as to define an upward forward run from the tail pulley to the head pulley and a lower return run from the head pulley to the tail pulley. The conveyor belt idler roller or rollers in the intermediate section carry a portion of the forward run of the conveyor belt. Material is deposited onto the upper forward run of the conveyor belt and is carried thereon towards the head section where the material is discharged. The material being carried on the forward run sometimes spills from the sides thereof and falls onto the upper surface of the conveyor belt return run.

Although the InterSystems conveyor works extremely well in most conditions, when the conveyor is being used to convey tobacco leaves or the like, the material which sometimes spills from the forward run of the conveyor belt downwardly towards the return run of the conveyor belt can become trapped beneath the lower surface of the return run above the bottom wall of the intermediate section. Additionally, the tobacco leaves sometimes adhere to the upper surface of the forward run and are not discharged therefrom which results in some tobacco leaves accumulating on the upper surface of the bottom wall of the intermediate section below the return run of the conveyor belt. Over a period of time, the accumulation of the material on the bottom wall of the intermediate section or sections can create a problem.

SUMMARY OF THE INVENTION

An enclosed belt conveyor assembly for conveying material along a forward longitudinal path of travel is disclosed and includes a head section, a tail section and one or more intermediate conveyor sections. The head section includes a head pulley mounted thereon for rotation about a horizontal lateral axis. The tail section includes a tail pulley for rotation about a horizontal lateral axis. One or more conveyor belt idler rollers are provided in the intermediate section or sections for rotation about a horizontal lateral axis. An endless flexible conveyor belt is trained longitudinally over the head pulley and the tail pulley and extends through the intermediate conveyor section to define an upper forward run from the tail pulley to the head pulley, and a lower return run from the head pulley to the tail pulley. The conveyor belt idler rollers in the intermediate section carry a portion of the forward run of the conveyor belt. The tail section includes a tail pulley shroud which substantially encloses the tail pulley and the rear portion of the conveyor belt return run. At least one wiper element is provided on the conveyor belt in a close relationship with respect to the inner surface of the bottom wall of the intermediate conveyor section for pulling material, that has spilled onto the inner surface of the bottom wall, towards the tail section. The tail pulley shroud has an inner surface which is closely positioned to the conveyor belt as the conveyor belt passes around the tail pulley so that as the wiper element passes through the tail section, the wiper will cause at least some of the spilled material being pulled thereby to be directed to the rearward end of the forward run for conveying to the desired discharged location. Preferably, the wiper element extends substantially across the width of the conveyor belt and has a thickness which is approximately one to two times as thick as the conveyor belt. The upper element is adhesively secured to the conveyor belt or mechanically fastened thereto.

A principal object of the invention is to provide an improved enclosed belt conveyor assembly.

A further object of the invention is to provide an enclosed belt conveyor assembly including an endless flexible conveyor belt having one or more transversely extending wiper elements mounted thereon for pulling material, that has spilled onto the inner surface of the bottom wall of the intermediate section, towards the tail section.

A further object of the invention is to provide an enclosed belt conveyor assembly including a wiper element mounted thereon which assists in removing material such as tobacco leaves which has accumulated on the inner surface of the bottom wall of the intermediate section of the conveyor.

These and other objects of the invention will be apparent to those skilled in the art.

BRIEF DESCRIPTION OF THE DRAWINGS

FIG. 1 is a partial perspective view of the enclosed belt conveyor assembly of this invention with portions thereof cut away to more fully illustrate the invention;

FIG. 2 is a partial perspective view of the conveyor belt of the enclosed belt conveyor assembly of this invention;

DESCRIPTION OF THE PREFERRED EMBODIMENT

Figure 3:
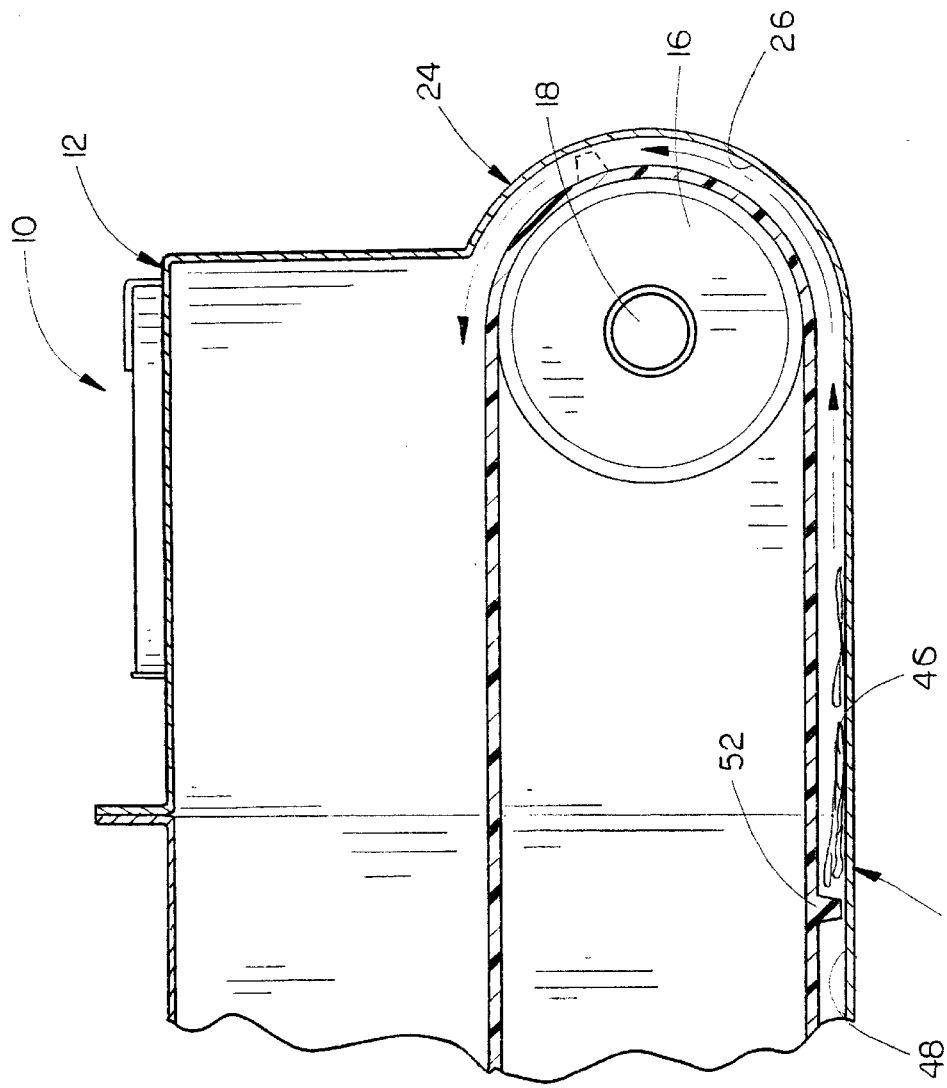
FIG. 3 is partial vertical sectional view of the tail section of the conveyor assembly.
Figure 4:
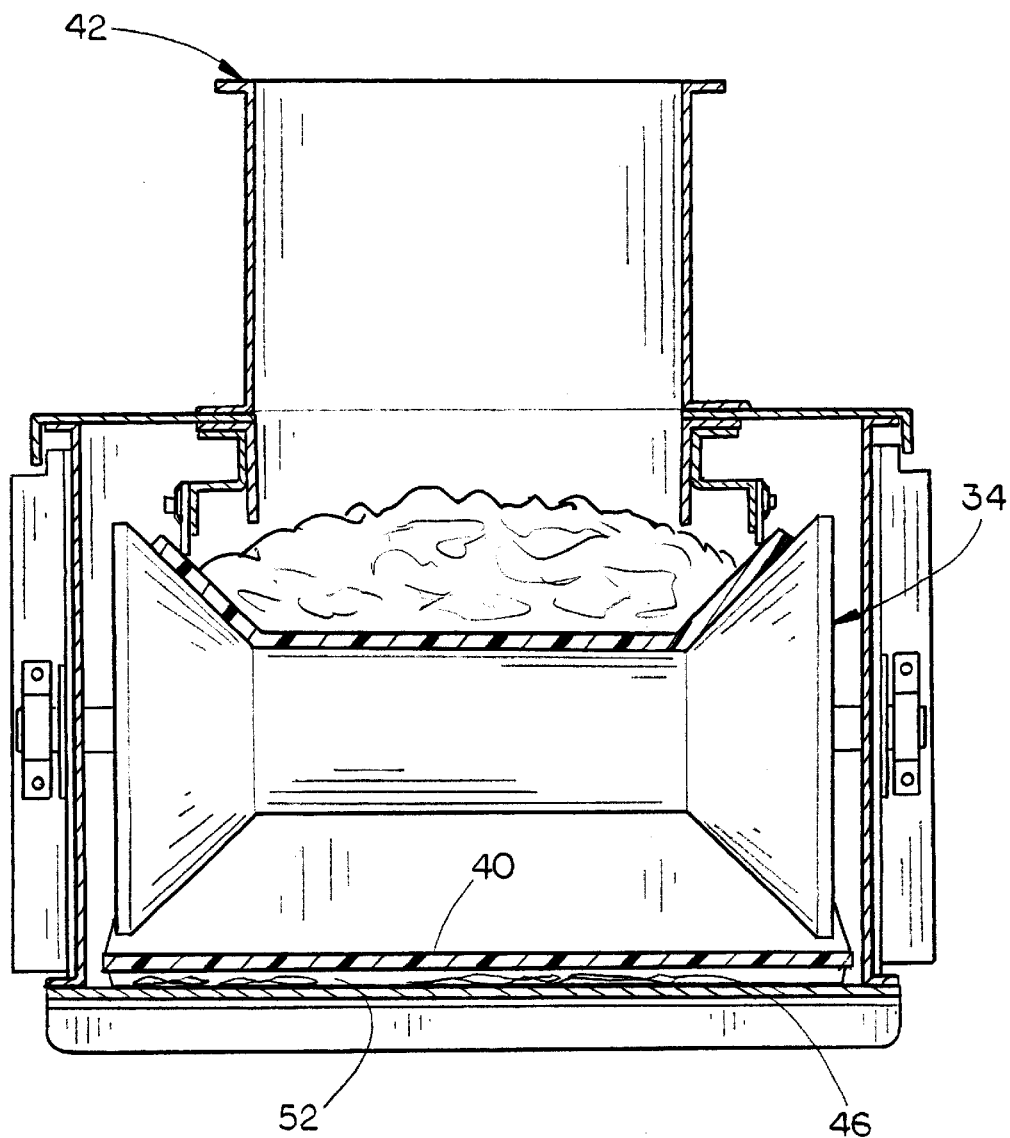
FIG. 4 is a sectional view of the conveyor assembly.

The enclosed belt conveyor assembly of this invention is referred to generally by the reference numeral 10 and which is designed for conveying material along a forward longitudinal path of travel. Assembly 10 includes a tail section 12, head section 14, and one or more intermediate sections 15 assembled between the tail section 12 and head section 14. Tail section 12 includes a tail pulley 16 including a tail pulley shaft 18, the opposite ends of which are rotatably mounted in bearings 20. Tail pulley 16 includes spiral wings 22 at its ends which serve to clean material which accumulates adjacent thereto by flipping or throwing the same upwardly onto the upper forward run of the conveyor belt in conventional fashion. Tail section 12 also includes a tail pulley shroud 24 which has an inner surface 26 which substantially encloses the tail pulley 16 and the rear portion of the conveyor belt return run as will be described hereinafter.

Head section 14 includes a head pulley 28 having a head pulley shaft 30, the opposite ends of which are mounted in bearings 32. Intermediate section 16 includes one or more idler rollers of the spool type and which are generally referred to by the reference numeral 34.

An endless conveyor belt 36 is trained longitudinally over the tail pulley 16 and the head pulley 28 to define an upper forward run 38 from the tail pulley 16 to the head pulley 28 and a lower return run 40 from the head pulley 28 to the tail pulley 16. Material is deposited onto the conveyor belt 36 by means of an intake section 42. The material is normally discharged from the conveyor 10 at the head section 14 in conventional fashion.

The enclosed belt conveyor assembly 10 described to this point is conventional in design except for the close positioning of the inner surface 26 of the tail pulley shroud 24 which substantially encloses the tail pulley 16 and the rear portion of the conveyor belt return run, as best seen in FIG. 3. As seen in FIG. 3, tobacco leaves or the like, generally referred to by the reference numeral 46, may accumulate on the upper surface 48 of the bottom wall 50 of intermediate section 16 as well as on the bottom wall portion of the tail section 12. Applicant has devised a means by which the tobacco leaves or the like are pulled or pushed from the upper surface 48 as will now be described. One or more transversely extending, spaced-apart wiper elements 52 are provided on the conveyor belt 36 and extend substantially across the width thereof, as seen in FIG. 2. The wiper elements 52 are preferably constructed of the same material as the conveyor belt 36 and may be integrally formed with the conveyor belt, as illustrated in FIG. 3. The wiper element 52 may be a separate component, which is usually the case, and will be secured to the belt 36 by adhesive or with mechanical fasteners. As seen in FIG. 3, the wiper element 52 moves in close proximity to the upper surface 48 of the bottom wall 50 and will pull the spilled material 46 along the bottom of the conveyor towards the tail pulley shroud 24. The wiper element 52 causes the material in the tail section to be lifted and pulled or thrown to the top side of the belt where it is conveyed to the proper discharge point. The wiper element 52 is preferably one to two times as thick as the belt. As stated, one or more of the wiper elements 52 may be used on each conveyor belt.

Thus it can be seen that a novel means has been provided for use on a conveyor belt of an enclosed belt conveyor assembly which prevents material from accumulating on the upper surface of the bottom wall of the conveyor housing.

Thus it can be seen that the invention accomplishes at least all of its stated objectives.

I claim:

1. An enclosed belt conveyor assembly for conveying material along a forward longitudinal path of travel, comprising:
    a head section having a head pulley for rotation about a horizontal lateral axis;
    a tail section having a tail pulley for rotation about a horizontal lateral axis;
    one of said tail pulley and said head pulley being a drive pulley with the other of said tail pulley and said head pulley being an idler pulley;
    at least one intermediate conveyor section assembled between said head section and said tail section;
    said intermediate conveyor section including a bottom wall having inner and outer surfaces;
    an endless flexible conveyor belt trained longitudinally over said head pulley and said tail pulley and extending through said intermediate conveyor section defining an upper forward run from said tail pulley to said head pulley, and a lower return run from said head pulley to said tail pulley;
    at least one conveyor belt idler roller in said intermediate section for rotation about a horizontal lateral axis for carrying a portion of said forward run of said conveyor belt;
    said tail section including a tail pulley shroud substantially enclosing said tail pulley and the rear portion of the conveyor belt return run;
    and at least one wiper element provided on said conveyor belt which is carried by said conveyor belt in a close relationship with respect to said inner surface of said bottom wall of said intermediate conveyor section for pulling material, that has spilled onto said inner surface of said bottom wall, towards said tail section.

2. The enclosed belt conveyor assembly of claim 1 wherein said tail pulley shroud has an inner surface which is closely positioned to said conveyor belt as said conveyor belt passes around said tail pulley so that as said wiper element passes through said tail section, said wiper will cause at least some of the spilled material being pulled thereby to be directed to the rearward end of said forward run for conveying to the desired discharge location.

3. The enclosed belt conveyor assembly of claim 2 wherein said wiper element extends substantially across the width of said conveyor belt.

4. The enclosed belt conveyor assembly of claim 2 wherein said wiper has a thickness which is approximately one to two times as thick as said conveyor belt.

5. The enclosed belt conveyor assembly of claim 2 wherein said wiper element is adhesively secured to said conveyor belt.

6. The enclosed belt conveyor assembly of claim 2 wherein said wiper element is mechanically fastened to said conveyor belt.

7. The enclosed belt conveyor assembly of claim 2 wherein a plurality of spaced-apart wiper elements are provided on said conveyor belt.

8. The enclosed belt conveyor assembly of claim 1 wherein said wiper element is flexible.

9. An enclosed belt conveyor assembly for conveying material along a forward longitudinal path of travel, comprising:
    a head section having a head pulley for rotation about a horizontal lateral axis;
    a tail section having a tail pulley for rotation about a horizontal lateral axis;
    one of said tail pulley and said head pulley being a drive pulley with the other of said tail pulley and said head pulley being an idler pulley;
    at least one intermediate conveyor section assembled between said head section and said tail section;
    said intermediate conveyor section including a bottom wall having inner and outer surfaces;
    an endless flexible conveyor belt trained longitudinally over said head pulley and said tail pulley and extending through said intermediate conveyor section defining an upper forward run from said tail pulley to said head pulley, and a lower return run from said head pulley to said tail pulley;

at least one conveyor belt idler roller in said intermediate section for rotation about a horizontal lateral axis for carrying a portion of said forward run of said conveyor belt;

said tail section including a tail pulley shroud substantially enclosing said tail pulley and the rear portion of the conveyor belt return run;

at least one wiper element provided on said conveyor belt which is carried by said conveyor belt in a close relationship with respect to said inner surface of said bottom wall of said intermediate conveyor section for pulling material, that has spilled onto said inner surface of said bottom wall, towards said tail section;

said tail pulley shroud has an inner surface which is closely positioned to said conveyor belt as said conveyor belt passes around said tail pulley so that as said wiper element passes through said tail section, said wiper will cause at least some of the spilled material being pulled thereby to be directed to the rearward end of said forward run for conveying to the desired discharge location;

and a material deflector in said tail section which deflects spilled material being carried by the upper surface of said lower return run, laterally towards the sides of said tail section.

10. An enclosed belt conveyor assembly for conveying material along a forward longitudinal path of travel, comprising:

a head section having a head pulley for rotation about a horizontal lateral axis;

a tail section having a tail pulley for rotation about a horizontal lateral axis;

one of said tail pulley and said head pulley being a drive pulley with the other of said tail pulley and said head pulley being an idler pulley;

at least one intermediate conveyor section assembled between said head section and said tail section;

said intermediate conveyor section including a bottom wall having inner and outer surfaces;

an endless flexible conveyor belt trained longitudinally over said head pulley and said tail pulley and extending through said intermediate conveyor section defining an upper forward run from said tail pulley to said head pulley, and a lower return run from said head pulley to said tail pulley;

at least one conveyor belt idler roller in said intermediate section for rotation about a horizontal lateral axis for carrying a portion of said forward run of said conveyor belt;

said tail section including a tail pulley shroud substantially enclosing said tail pulley and the rear portion of the conveyor belt return run;

said tail pulley having a plurality of spaced-apart paddles secured to each end thereof which are positioned laterally of the sides of said conveyor belt;

and at least one wiper element provided on said conveyor belt which is carried by said conveyor belt in a close relationship with respect to said inner surface of said bottom wall of said intermediate conveyor section for pulling material, that has spilled onto said inner surface of said bottom wall, towards said tail section;

said tail pulley shroud has an inner surface which is closely positioned to said conveyor belt as said conveyor belt passes around said tail pulley so that as said wiper element passes through said tail section, said wiper will cause at least some of the spilled material being pulled thereby to be directed to the rearward end of said forward run for conveying to the desired discharge location.

11. An enclosed belt conveyor assembly for conveying material along a forward longitudinal path of travel, comprising:

a head section having a head pulley for rotation about a horizontal lateral axis;

a tail section having a tail pulley for rotation about a horizontal lateral axis;

one of said tail pulley and said head pulley being a drive pulley with the other of said tail pulley and said head pulley being an idler pulley;

at least one intermediate conveyor section assembled between said head section and said tail section;

said intermediate conveyor section including a bottom wall having inner and outer surfaces;

an endless flexible conveyor belt trained longitudinally over said head pulley and said tail pulley and extending through said intermediate conveyor section defining an upper forward run from said tail pulley to said head pulley, and a lower return run from said head pulley to said tail pulley;

at least one conveyor belt idler roller in said intermediate section for rotation about a horizontal lateral axis for carrying a portion of said forward run of said conveyor belt;

said tail section including a tail pulley shroud substantially enclosing said tail pulley and the rear portion of the conveyor belt return run;

and at least one wiper element provided on said conveyor belt; said wiper element having a substantially uniform cross section and being carried by said conveyor belt so that said wiper is in close relationship with said inner surface of said bottom wall of said intermediate conveyor section.

* * * * *